United States Patent [19]
Bresolin

[11] Patent Number: 6,106,709
[45] Date of Patent: Aug. 22, 2000

[54] FILTERING DEVICE FOR AQUARIUMS

[75] Inventor: Valerio Bresolin, Pove Del Grappa, Italy

[73] Assignee: Hydor S.R.L., Bassano Del Grappa, Italy

[21] Appl. No.: 09/024,125

[22] Filed: Feb. 17, 1998

[30] Foreign Application Priority Data

Jun. 5, 1997 [IT] Italy .................................. VE97A0020

[51] Int. Cl.⁷ .................................................. A01K 63/04
[52] U.S. Cl. .......................... 210/169; 210/238; 210/266; 210/315; 210/323.2; 210/340; 210/416.2; 119/259; 119/260
[58] Field of Search ..................................... 210/110, 169, 210/232, 206, 209, 266, 315, 340, 341, 416.2, 418, 420, 323.2, 238; 119/245, 259, 227, 260

[56] References Cited

U.S. PATENT DOCUMENTS

| | | |
|---|---|---|
| 3,687,291 | 8/1972 | Willinger . |
| 3,855,970 | 12/1974 | Harwood . |
| 4,602,996 | 7/1986 | Willinger . |
| 4,684,462 | 8/1987 | Augustyniak . |
| 4,687,575 | 8/1987 | Grose . |
| 4,817,561 | 4/1989 | Byrne et al. . |
| 4,820,410 | 4/1989 | Cavalcante . |
| 5,017,241 | 5/1991 | Ryan . |
| 5,037,551 | 8/1991 | Barkley et al. . |
| 5,059,315 | 10/1991 | Senape . |
| 5,176,824 | 1/1993 | Willinger et al. . |
| 5,228,986 | 7/1993 | Ellis et al. . |
| 5,236,582 | 8/1993 | Huang . |
| 5,397,463 | 3/1995 | Woltmann . |
| 5,453,182 | 9/1995 | Kikuta . |
| 5,474,673 | 12/1995 | Ludlow . |
| 5,628,905 | 5/1997 | Montalbano . |
| 5,728,293 | 3/1998 | Guoli et al. . |

Primary Examiner—David A. Simmons
Assistant Examiner—Fred Prince
Attorney, Agent, or Firm—Hoffman, Wasson & Gitler, P.C.

[57] ABSTRACT

A filtering device for aquariums, of the type to be hung on the outside of an aquarium, having a casing housing at least one filtering mass, an electric pump for drawing water from the aquarium through a dip tube, and a member for returning the filtered water to the aquarium. The base of the casing separates a first chamber housing an impeller of the electric pump from a chamber housing the filtering mass and is provided with at least one aperture providing communication between said two chambers.

14 Claims, 4 Drawing Sheets

FILTERING DEVICE FOR AQUARIUMS

FIELD OF THE INVENTION

This invention relates to a filtering device for aquariums, of the type to be hung on the outside of the aquarium and commonly known as a "power filter" or "hang-on filter".

BACKGROUND OF THE INVENTION

Filters having a box casing containing a filtering mass and provided with a wide hook for its suspension from the upper edge of a vertical wall of the aquarium are known. A tube which extends, parallel to the wall, on the inside of the aquarium and dips into the water is connected to the casing. A pump draws the water to be filtered through the tube and passes it through the filtering mass, and returns into the aquarium by passing it over a wide hook, to form a cascade.

A drawback common to most known hang-on filters is that if the electricity supply is interrupted and hence the electrical pump stops, the water contained in the dip tube falls by gravity into the aquarium and, by syphoning, drags with it all the water contained in the filter casing. If, as is generally the case, the water level in the aquarium is below the level of the pump impeller chamber, this chamber empties to unprime the pump, requiring outside action for its re-priming.

To eliminate this drawback, it has already been proposed to form the filter casing as two separate chambers, one of which houses the filtering mass while the other houses the pump impeller (U.S. Pat. No. 4,602,996 to Willinger). The two chambers are separated by a vertical baffle in which one or more small apertures are provided. During normal operation the water drawn by the pump is urged by the impeller into the chamber containing the filtering mass, to pass over the separation baffle between the two and be returned to the aquarium after filteration.

If the electricity supply fails, the impeller chamber rapidly empties by the syphon effect. However, even after this emptying, the water contained in the chamber housing the filtering mass slowly flows through the aperture provided in the vertical baffle and into the impeller chamber. It is no longer transferred into the aquarium because the syphon has been unprimed. Consequently, when the electricity supply returns, the impeller chamber is full of water and the pump can assume regular operation.

This known filter solves the problem of re-priming the pump without requiring external intervention. But, at the same time, it has a low filtering capacity as only a part of the space within the casing houses the filtering mass, the remainder forming the impeller chamber. Consequently, to achieve a filtering capacity equal to that of a filter with a non-self priming pump, the above described filter would have to be considerably larger.

The aquarium taught by Willinger has left and right chambers to house the filter and pump. These chambers have an equal height but the pump only occupies a fraction of the receiving chamber's volume. A great deal of the volume of the chamber is located above the pump and, since it has no filtering element, is unproductive space. Also, if the electricity were to fail, gravity would slowly drain water from the filtering chamber into the receiving chamber only until the level in both chambers were equal. A tube which extends, parallel to the wall, on the inside of the aquarium and dips into the water is connected to the casing. A pump draws the water to filtered through the tube and passes it through the filtering mass, and returns into the aquarium by passing it over a wide hook, to form a cascade.

The main object of the invention is to provide a filter of the initially described type which, besides not producing unpriming of the pump on electricity supply failure, has an overall size substantially equal to that of traditional non-self priming filters.

A further object of the invention is to provide a filter which can be fitted with various accessories and be customized, on the basis of any specific performance required of the aquarium to which it is to be applied.

It is another object of the invention to provide an aquarium filter whose filtering capacity is the majority of the filters chamber's volume. It is also an object of the invention to have a filter whose impeller chamber is as small as possible.

BRIEF SUMMARY OF THE INVENTION

These objects are attained according to the invention through a filtering device for aquariums, of the type to be hung on the outside of an aquarium. It has a casing housing at least one filtering mass, an electric pump for drawing water from the aquarium through a dip tube, and a member for returning the filtered water to the aquarium. The base of the casing separates a first chamber housing an impeller of the electric pump from a second chamber housing the filtering mass. It is provided with at least one aperture providing fluid communication between the first and second chambers.

The impeller chamber of the instant invention has a height that is only large enough to accommodate the pump. The pump substantially fills the chamber and the remaining space of the aquarium filter is substantially occupied by the filter itself.

When the electricity stops, gravity cause water from the filter to descend into the impeller chamber. The filter can completely empty into the impeller chamber since the impeller chamber is located lower than the filter.

BRIEF DESCRIPTION OF THE DRAWINGS

A preferred embodiment of the invention is further clarified hereinafter with reference to the accompanying drawings, in which.

DESCRIPTION OF A PREFERRED EMBODIMENT

Figure 1:
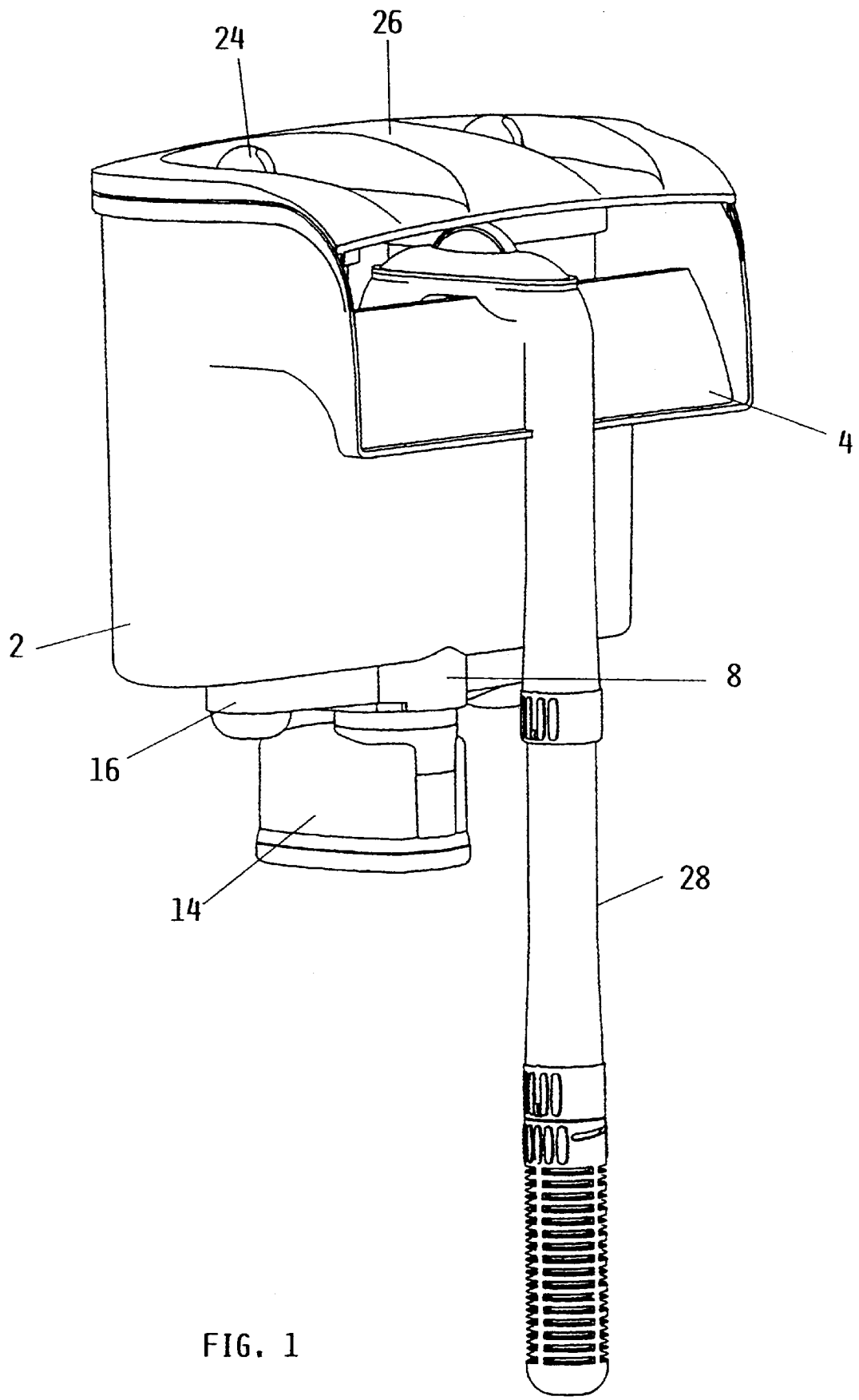
FIG. 1 is an overall perspective view of the filtering device according to the invention.
Figure 2:
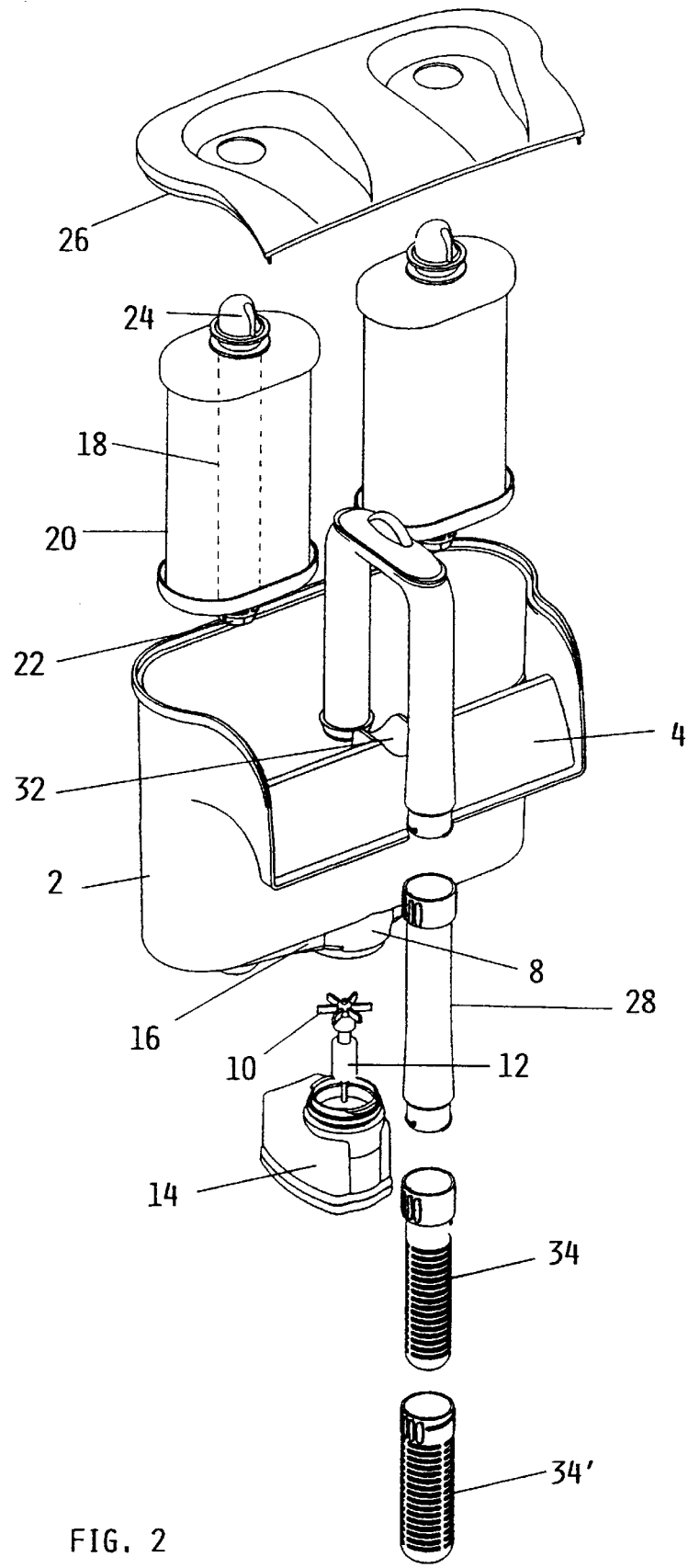
FIG. 2 shows it in exploded view.
Figure 3:
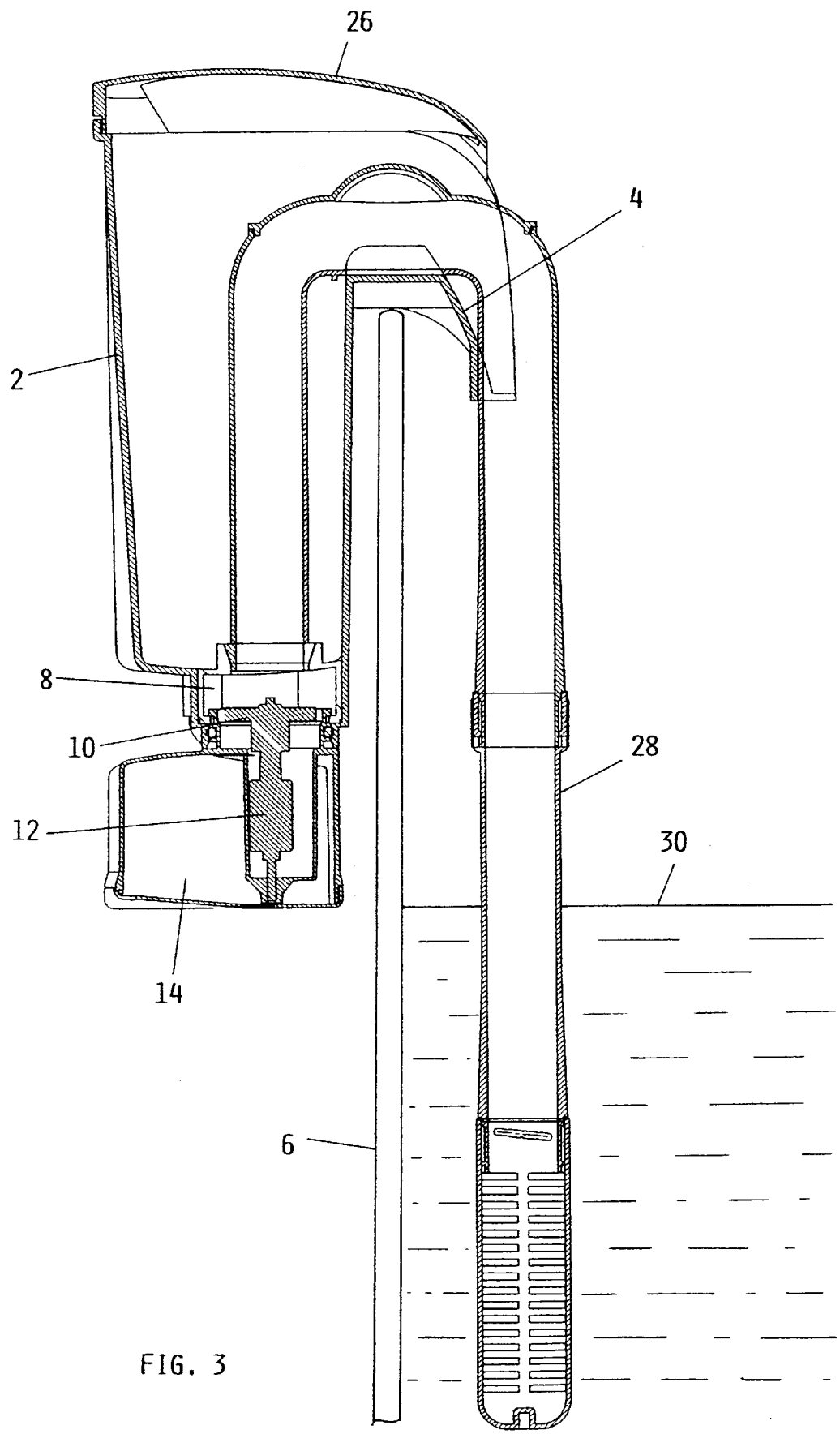
FIG. 3 shows it in vertical section.

As can be seen from the figures, the filtering device according to the invention comprises a box casing 2 of approximately rounded parallelepiped shape. A long hook-like appendix 4 is provided on a lateral wall and has the dual purpose of maintaining the device on a wall 6 of an aquarium and of conveying the filtered water into the aquarium as a cascade.

A chamber 8 is formed in a central position of the casing base. An impeller 10 is housed in the chamber. An electric motor 14 has a rotor shaft 12 which drives the impeller. The motor is fixed to the casing base 2.

Two rectilinear channels 16 extend from the chamber in opposite directions and have spaced apart openings in the base of the casing 2. Vertical tubular elements 18 with a perforated wall are inserted into the openings. Two filtering masses 20 consisting of foam material are applied to the tubular elements. A throttle valve 22 is provided on the lower end of each tubular element. As will be apparent hereinafter, it enables the water flow fed by the impeller 10 into the corresponding tubular element 18 to be regulated. A cover 26 closes the casing 2. A knob 24 projects from the cover and adjusts the throttle valve.

An aperture is in the upper part of chamber 8. A dip tube 28 for the aquarium water 30 is inserted into this aperture. The dip tube 28 is U-shaped, with a longer arm which dips into the aquarium, a horizontal portion which straddles the hook-like appendix 4 of the casing 2, and a shorter arm which at its free end is inserted into the aperture provided in the chamber 8 for the impeller 10.

A small saddle 32 on the hook-like appendix 4 makes the tube more stable. The horizontal portion of the U-tub 28 rests on the saddle.

A prefilter consisting of inner and outer cylindrical grids 34, 34', inserted one into the other and mutually engaged at a threaded portion, is mounted on the end of the longer arm of the dip tube. The angular position of the outer grid 34' relative to the inner grid 34 can be varied. A series of horizontal slots provided in both can be in registry to a greater or lesser extent.

The operation of the filtering device according to the invention when hung by the appendix on the vertical wall of the aquarium is as follows:

The electric motor 14 drives the impeller 10 which feeds the water contained in the chamber 8 through the two channels 16 and into the tubular elements 18. The tubular elements are surrounded by the respective filtering masses 20. From these, the water passes radially through the filtering masses 20, completely fills the casing 2, passes beyond the upper edge of the hook-like appendix 4 and pours into the aquarium by forming a cascade. At the same time, the vacuum created by the impeller 10 within the chamber 16 draws new water from the aquarium through the dip tube 28.

If the electricity supply fails for any reason, the impeller 10 stops. In this case, the water contained in the tube 28 falls by gravity into the aquarium and, by syphoning also drags the water contained in the impeller chamber 8, so temporarily unpriming the pump. However, the water contained in the casing 2 and partly trapped within the filtering masses 20 slowly descends by gravity through the apertures provided in the tubular elements 16. After passing through the throttle valves 22 and channels 16, it collects in the impeller chamber 8 to fill it, setting the pump for operation as soon as the electric motor is again powered.

It will be apparent that the filtering device of the invention is considerably more advantageous than traditional filtering devices, as it provides for automatic pump re-priming without requiring any substantial overall size increase, and moreover, offers a series of further advantages, namely:

the facility for regulating the water recirculation flow from the outside without interrupting the operation of the filtering device;

the ability to replace the filtering masses 20 with others of different characteristics more suitable for the particular type of fish contained in the aquarium;

the facility for adjusting the axial position of the outer grid relative to the inner grid, so that the slots provided in them face each other to a greater or lesser extent depending on the size of the fish contained in the aquarium.

Seats for elements containing absorbent filtering material to be traversed by the filtered water before it forms the cascade are provided in proximity to the hook-like appendix 4.

Figure 4:
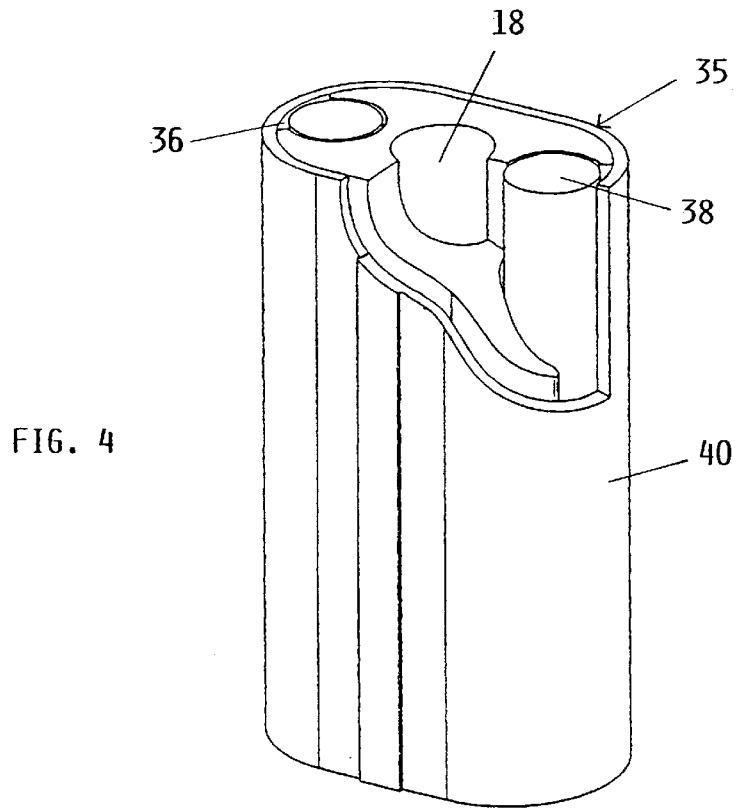
FIG. 4 shows a different embodiment of a filtering mass.

In the embodiment shown in FIG. 4, a cassing 40 houses a body 35 of sponge material comprising two cylindrical seats 36 housing two activated carbon cartridges 38 are provided on the tubular elements. The body 35 is covered by an outer layer of wadding having the edges connected through hook and loop fasteners.

Figure 5:
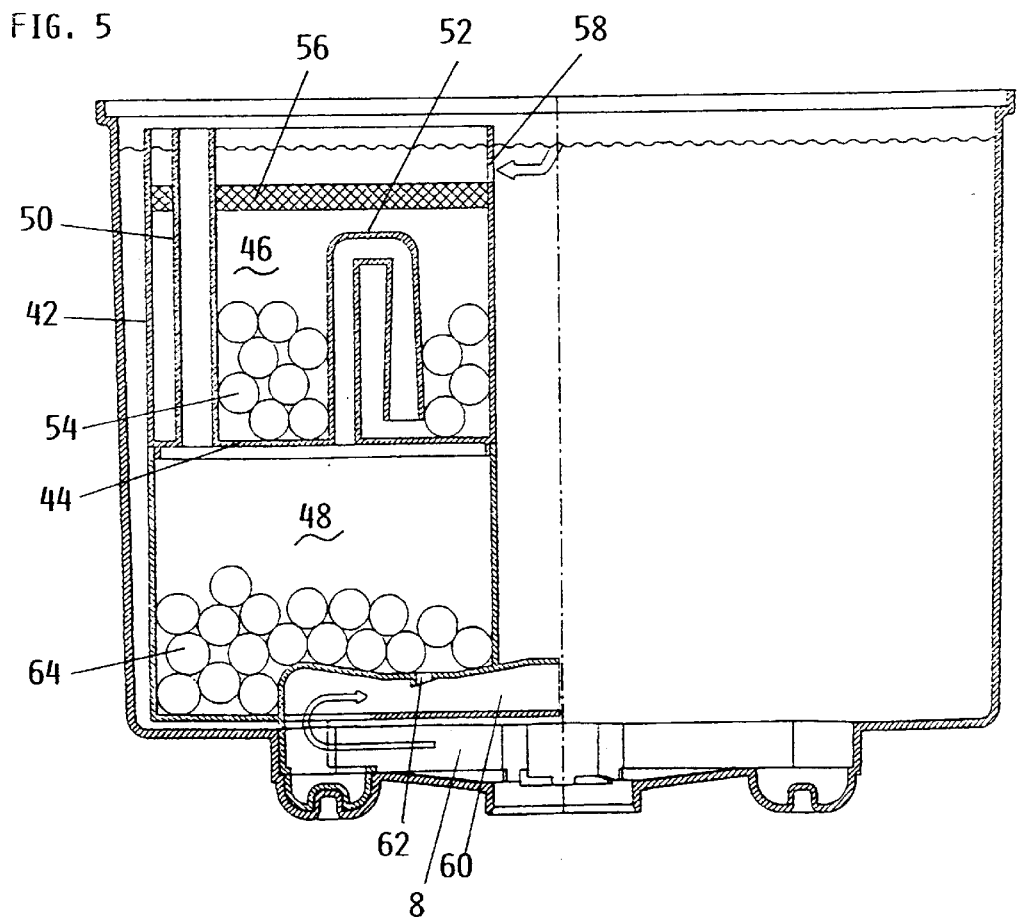
FIG. 5 shows a further embodiment of a filtering mass.

In the embodiment shown in FIG. 5, the filtering device consists of a prismatic casing 42 of substantially elliptical section divided by a horizontal baffle 44 to define on upper and lower chamber 46, 48. A vertical conduit 50 which connects the lower chamber 48 to the outside, and a U-shaped syphon conduit 52 are provided in the upper chamber. A plurality of ceramic balls 54 covered by a sponge 56 are housed in the upper chamber. The lateral surface of the chamber 46 has a hole 58.

A conduit 60 connecting the lower chamber to the impeller chamber 8 and comprising a hole 62 is provided in the lower chamber. A plurality of ceramic balls 64 are housed in the lower chamber.

The device of this embodiment operates as follows:

Following the position of the casing 2 on the outside of the aquarium and to the operating of the impeller, the water surface is below the upper edge of the body 42 but above the hole 58. With this initial configuration and assuming that the chambers 46 and 48 are empty, the water entering the conduit 60 from the chamber 8 draws only air through the hole 62, by the Venturi effect. In the meantime, water enters the chamber 46 through the hole 58, wetting the balls 54. When the water level in the chamber 46 reaches the elbow of the syphon conduit, this becomes primed such that the water is able to enter the chamber 48 and wet the balls 64. As the syphon diameter is greater than the diameter of the entry hole 58 into the chamber 46, this rapidly empties with the result that the balls 54 are no longer wetted and consequently are able to dry. The passage of water through the conduit 60 results in the water contained in the chamber 48 being drawn through the hole 62, with consequent emptying of the chamber 48 and drying of the balls 64. In the meantime, more water can enter the chamber 46 to begin a new filing cycle similar to the aforedescribed.

The effect of this continuous wetting and drying of the balls 54, 64 is to form microbacterial flora with purifying action on the aquarium water.

What is claimed is:

1. A filtering device for aquariums comprising;

a casing having a wall dividing it into an upper chamber and a lower chamber;

the upper chamber and lower chamber being in fluid communication;

a pump located within said lower chamber for drawing water into the lower chamber;

a filter located within said upper chamber for filtering the water;

a water outlet for returning filtered water to the aquarium; and a dip tube having two ends, a first end connected to the lower chamber and a second end for drawing water from the aquarium.

2. The filter device of claim 1 wherein; the dip tube is U-shaped.

3. The filtering device of claim 1 further comprising;
a pair of concentric cylindrical grids provided with slots attached to the second end of the dip tube, the cylindrical grids being movable relative to one another in an axial direction, to align the slots of the two grids.

4. A filtering device for aquariums comprising;
a casing having a wall dividing it into an upper chamber and a lower chamber;
the upper chamber and lower chamber being in fluid communication;
a pump located within said lower chamber for drawing water into the lower chamber;
a filter located within said upper chamber for filtering the water;
a water outlet for returning filtered water to the aquarium;
at least one aperture provides the fluid communication between the upper and lower chambers;
said filter is at least one filtering mass mounted on at least one vertical tubular element, a lower end of the tubular element being inserted into the at least one aperture that provides the fluid communication between the upper and lower chambers.

5. The filtering device of claim 4 wherein; there are two tubular elements surrounded by filtering masses, each tubular element inserted into the at least one aperture that provides fluid communication between the upper and lower chambers.

6. The filtering device of claim 4 further comprising;
a flow regulating valve is located on the lower end of the at least one tubular element, a knob is located at an upper end of the tubular element to control the flow regulating valve.

7. The filtering device of claim 4 wherein;
the at least one filtering mass comprises a sponge material body having two cylindrical seats housing two activated carbon cartridges.

8. A filtering device for aquariums comprising;
a casing having a wall dividing it into an upper chamber and a lower chamber;
the upper chamber and lower chamber being in fluid communication;
a pump located within said lower chamber for drawing water into the lower chamber;
a filter located within said upper chamber for filtering the water;
a water outlet for returning filtered water to the aquarium;
said water outlet is a hook-shaped appendix projecting from the casing;
the hook appendix has an upper edge, the upper edge having seats for containers of absorbent filtering material, the filtered material having to transverse the containers before leaving the filtering device.

9. A filtering device for aquariums comprising;
a casing having a wall dividing it into an upper chamber and a lower chamber:
the upper chamber and lower chamber being in fluid communication;
a pump located within said lower chamber for drawing water into the lower chamber;
a filter located within said upper chamber for filtering the water;
a water outlet for returning filtered water to the aquarium; and
the upper chamber has a prismatic casing divided into a first and second chamber separated by a horizontal baffle, ceramic balls housed in the first and second chamber, and the first and second chambers being in fluid communication.

10. The filter device of claim 9 wherein;
a U-shaped syphon conduit provides the fluid communication between the first and second chambers.

11. The filtering device of claim 9 further comprising;
a sponge covering the ceramic balls of the first chamber.

12. The filtering device of claim 9 further comprising;
an aperture in the prismatic casing, the aperture providing fluid communication between the first chamber and the outside.

13. In combination, an aquarium and aquarium filter comprising
an aquarium having at least one sidewall for holding water;
a filter attached to the at least one sidewall, the filter comprising;
a casing having a wall dividing it into an upper chamber and lower chamber;
the upper chamber and lower chamber being in fluid communication;
a pump located within the lower chamber for drawing the water into the filter;
a water outlet for returning filtered water to the aquarium; and
a dip tube having two ends, a first end connected to the lower chamber and a second end that extends into the water in the aquarium.

14. In combination, an aquarium and aquarium filter comprising
an aquarium having at least one sidewall for holding water;
a filter attached to the at least one sidewall;
the filter comprising;
a casing having a wall dividing it into an upper chamber and lower chamber;
the upper chamber and lower chamber being in fluid communication;
a pump located within the lower chamber for drawing the water into the filter;
a water outlet for returning filtered water to the aquarium; and
the water outlet being a hook-shaped appendix projecting from the casing;
the hook-shaped appendix extending on the inside of the aquarium sidewall.

* * * * *